United States Patent [19]

von Holdt

[11] 4,441,622
[45] Apr. 10, 1984

[54] THREADED PORT AND PLUG HAVING ACCESS APERTURES

[76] Inventor: John W. von Holdt, 7430 N. Croname Rd., Niles, Ill. 60648

[21] Appl. No.: 208,673

[22] Filed: Nov. 20, 1980

Related U.S. Application Data

[63] Continuation-in-part of Ser. No. 141,398, Apr. 18, 1980, Pat. No. 4,280,976.

[51] Int. Cl.³ .............................................. B65D 39/00
[52] U.S. Cl. ...................................... 217/99; 220/288; 220/231; 220/254
[58] Field of Search .......... 220/231, 253, 254, DIG. 6, 220/288, 303; 217/99

[56] References Cited

U.S. PATENT DOCUMENTS

| 485,430 | 11/1892 | Riner | 217/99 X |
| 3,184,091 | 5/1965 | Hoffman | 217/99 |

Primary Examiner—George T. Hall
Attorney, Agent, or Firm—Charles F. Pigott, Jr.

[57] ABSTRACT

A molded, threaded port and plug may be produced in a container top in which a threaded port is defined at least in part by an inwardly projecting sleeve from the container top having first lateral aperture means, a plug threadedly mounted in the sleeve having an outwardly facing open recess defined by a tubular wall, and second lateral apertures communicating through the tubular wall. In one rotational position of the plug a flow channel is opened to the interior of the container, while in another rotational position of the plug the flow channel is sealed.

3 Claims, 6 Drawing Figures

THREADED PORT AND PLUG HAVING ACCESS APERTURES

CROSS-REFERENCE TO RELATED APPLICATION

This application is a continuation-in-part of U.S. application Ser. No. 141,398, filed Apr. 18, 1980, now U.S. Pat. No. 4,280,976.

BACKGROUND OF THE INVENTION

In the previously-cited application, a mold is disclosed which is adapted to simultaneously mold a closure having a threaded port, plus a separated threaded plug adapted for sealing the port. As the mold opens, the plug is screwed in the port so that the complete closure is provided in a single mold shot.

In this present application, a port closure, which optionally may be made in accordance with the teachings of the previous application, is disclosed in which the port closure may be opened for access to the container, without removal of the plug from the aperture, and at the same time reliably sealed by movement of the plug to another rotational position.

Threaded port closures are used for large cans, for example five-gallon paint cans, large containers of industrial chemicals, and also other large containers, for example brine barrels for the storage of fish and the like.

Typically, the plugs of the port closures must be removed to open the container. In many instances it would be desirable to open the container without removing the plug.

Also, in containers such as brine barrels, beer or root beer kegs, or the like, it may be desirable to open the container sufficiently to vent pressure from the container, or to determine that the liquid level in the container remains at the top. For example, water must be periodically added to brine storage barrels and the like.

By this invention, the plug closure of this invention may be opened without removal of the plug to add or remove contents of the container. For example, the container may be vented in this manner, or the closure may be utilized to determine whether the liquid in the container is still up to the top. An inwardly projecting plug of this invention may have an outwardly-facing recess which can receive flowing brine from the interior of the container when open and when the container is filled to the top. Otherwise, no brine or other liquid will flow into the recess of the plug, and in that circumstance, water or other fluid material may be added to fill the container to the top without removing the plug.

At the same time the plug may be removed whenever such is desired.

DESCRIPTION OF THE INVENTION

The invention may be utilized in conjunction with a container having a closure with a threaded port in the lid (or container top). A threaded plug is positioned in the port, with the threaded port being defined at least in part by a sleeve projecting inwardly from the lid. The sleeve defines first lateral aperture means, with the plug defining an outwardly-facing, open recess defined at least in part by a tubular wall of the plug positioned within the sleeve. The tubular wall defines second lateral aperture means communicating through the tubular wall, and positioned to register with the first lateral aperture means in a first rotational position of the plug, for flow communication through the closure. However, the first and second lateral aperture means may be spaced from each other in a second rotational position of the plug when it is desired to seal the port.

Accordingly, in those circumstances in which the sleeve does inwardly project into the container, it can define a well, with the second lateral aperture means being submerged below the upper end of the container, so that when the two sets of apertures are brought into registry, a filled container will discharge a sample of its contents into an open well defined in the plug. If no such contents are discharged, then the user can know that the liquid level inside of the container is low, and liquid can be added to the well of the plug to flow into the container. When no further liquid enters the container, the user can know that the liquid level has returned to its full state.

Also, the closure of this invention can be utilized in those instances where it is desired to sample the contents of the filled containers without removing the plug from the threaded port.

It is preferred for the outermost thread portion of the threaded plug, preferably extending at least 360° about the plug, to be of a different pitch from the remaining thread of the plug, to serve as a seal and retaining lock of the plug in the threaded port particularly in the closed position. Generally this 360° or more segment of thread of different pitch will engage the thread of the threaded port about 360° as a seal in the closed position of the plug. The plug may typically be withdrawn a small distance to break this seal and simultaneously bring the first and second aperture means into registry for opening. Accordingly, as the container is filled by pouring liquid into the plug so that it flows through the first and second aperture means, air can vent through the interlocking threads of the plug and sleeve so that the container may be completely filled. However, air cannot so vent when the segment of different pitch thread engages the thread of the port to provide a seal.

An improvement of the mold of the previously-cited application is also disclosed herein. In accordance with this invention, as shown, means are provided for forming first and second apertures respectively in the formed threaded ports and plugs molded therein to produce closures in accordance with this invention.

Figure 1:
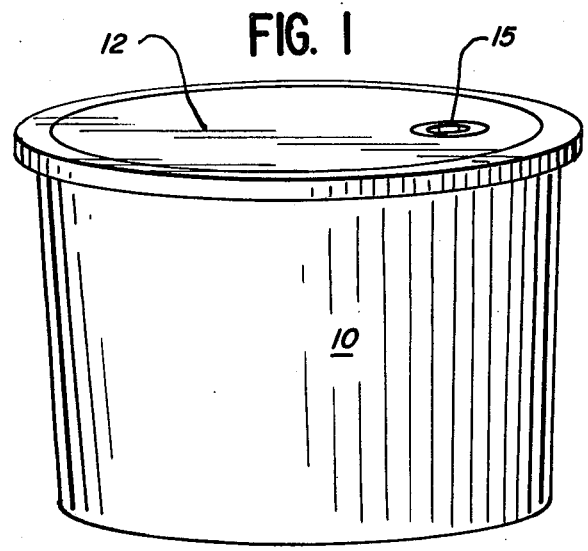
FIG. 1 is a perspective view of a container carrying the closure of this invention.

Referring to FIG. 1, a bucket 10 is shown having a lid 12 utilizing the closure plug 15 of this invention. The bucket may be fabricated with a closure and lid as an integral part of it, or, as shown in FIG. 1, a snap-on bucket lid may be applied utilizing the closure of this invention.

Alternatively, lid 12 may be heat sealed or adhesively bonded to bucket 10 about its periphery. Such a bucket may be used as a five-gallon paint bucket, or as a container for chemicals, foods, and the like.

Figure 2:
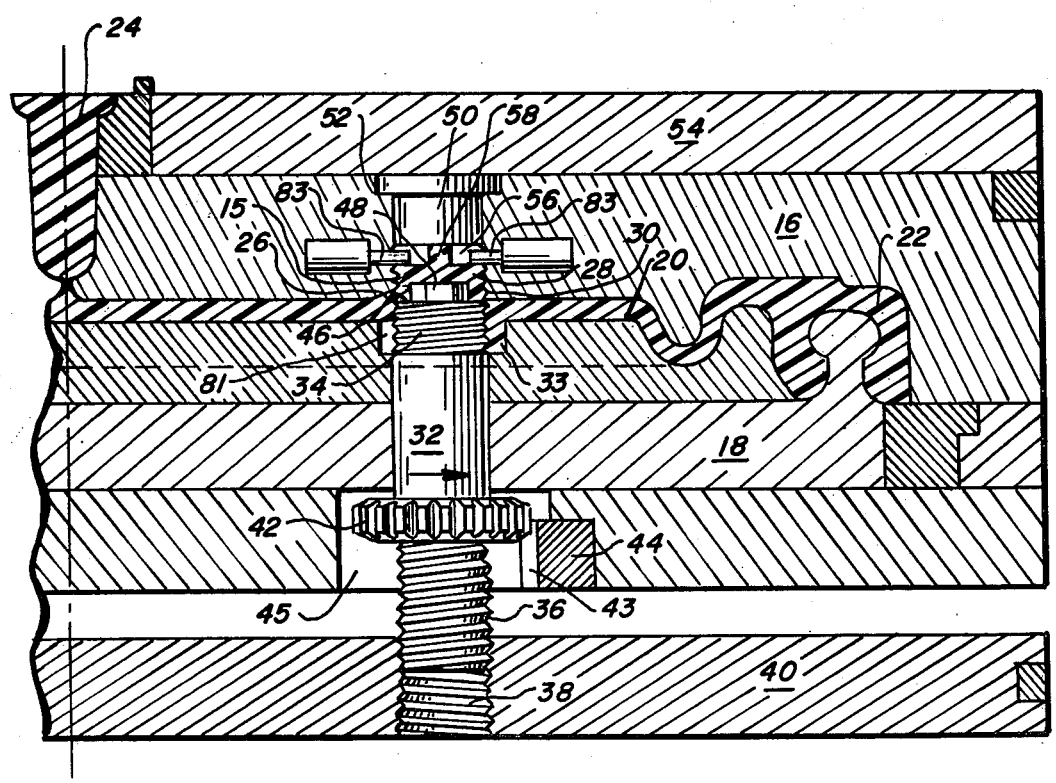
FIG. 2 is a longitudinal sectional view of an injection mold system utilizing the invention of this application for making the closure of FIG. 1, shown in an initial state of operation.

Referring to FIG. 2, an injection mold is provided, being made of an upper mold half 16 and a lower mold half 18, between which is defined first cavity means 20 for defining the closure lid 12 for bucket 10. Lid 12 defines a bucket rim grasping member 22 of annular shape which may be of any conventional design, and particularly may be of a design as disclosed in U.S. application Ser. No. 101,220, filed by me on Dec. 7, 1979, or U.S. Pat. No. 4,210,258.

A main sprue 24 for the introduction of molding compound to first cavity 20 is shown. A subgate 26 is provided, with the gate being relatively narrow in transverse dimension, to permit molding compound to pass from first cavity 20 to a second cavity 28 which is adapted to form the threaded plug as shown therein.

Second cavity 28 defines a helical thread-forming groove 30 for defining the thread of the plug formed in cavity 28.

A rotatable shaft 32 is provided, carrying an external helical thread-forming groove 34, and extending through first cavity 20 to help define closure port 33 of lid 12, molded in cavity 20. Rotatable shaft 32 also carries helical thread 36 at its rear end which mates in rotatable relation with helical thread 38 of platen 40.

Shaft 32 also carries a gear 42 which is in operating relation with a rack 44 (or a rack chain) having teeth 43 which engage gear 42, so that shaft 32 can be rotated by motion of the rack, which may be appropriately and conventionally activated. Shaft 32 moves inwardly or outwardly of the first cavity 20 as it rotates.

Rack 44 as shown is wide enough to accommodate the longitudinal motion of shaft 32 as it rotates back and forth, without losing interconnection with gear 42. Also space 45 is provided to permit the back-and-forth, longitudinal motion of gear 42 during rotation of shaft 32.

Shaft 32 terminates at its outer end at the second cavity 28 to define one wall 46 of the second cavity. Shaft 32 defines a projecting member 48, extending outwardly from wall 46 and projecting into second cavity 28. As specifically shown, projecting member 48 is shaped in the form of a hexagon in cross section, in the shape of a hexagonal head of a bolt or the like, so that the plug molded in second cavity 28 defines a cavity corresponding to the hexagonal projecting member 48. As the result of this, a separable mechanical linkage is formed between the end of shaft 32 and the plug molded in second cavity 28, so that the molded plug will rotate with shaft 32.

Figure 3:
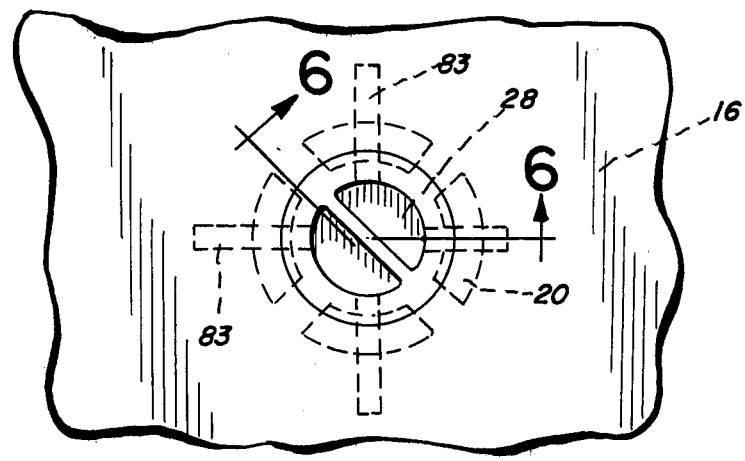
FIG. 3 is a fragmentary plan view, with parts removed, of the closure of this invention in the stage of the process of manufacture shown in FIG. 2.

The side of second cavity 28 opposed to wall 46 is defined by a rotatable wall member 50 which, as shown in FIGS. 2 and 3, is a freely rotatable metal member secured in the seat 52 of mold half 16 by an overlaying platen 54. Wall forming member 50 defines projections 56 to create in the opposite side of plug 15 indentations which serve to define means to facilitate removal of the plug from the threaded port during use of the container.

For example, a tongue 58 may be defined by projecting members 56 of the rotatable wall forming member 50. This may be gripped with pliers or the like after molding and used to open the molded plug 15 or to close it, as may be desired.

Figure 4:
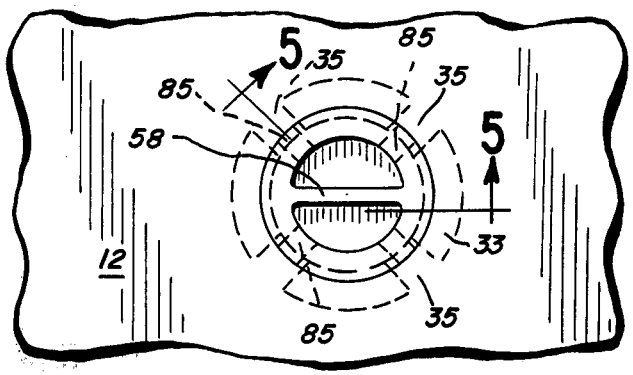
FIG. 4 is a plan view of the closure of this invention in which the plug is shown in the open position.

In accordance with this invention, one or more projections 81 are provided to penetrate into the portion of mold cavity which defines closure port 33 of lid 12. These projections serve to define the first lateral aperture means of the sleeve or port 33 described above, which aperture means are shown in FIG. 4 to comprise a plurality of spaced longitudinal slots 35 in sleeve 33.

Figure 5:
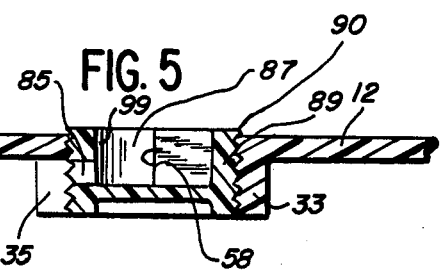
FIG. 5 is a fragmentary sectional view of the closure of this invention, taken along line 5—5 of FIG. 4.
Figure 6:
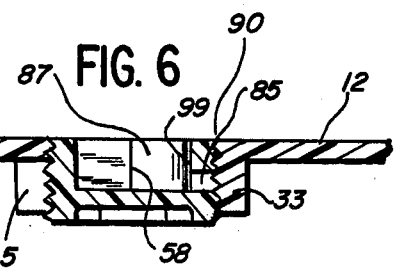
FIG. 6 is a fragmentary sectional view taken along the line 6—6 of FIG. 3.

As a further distinction over the previous application, conventional retractable core pin members 83 may be provided in upper mold half 16 to occupy a radial position relative to the second mold cavity to define second apertures 85 in the plugs 15 formed in the second mold cavity 28. Accordingly, after hardening of each molded plug in the second mold cavity 28, core pins 38 may be withdrawn in conventional manner, and plug 28 may then be drawn downwardly by rotation of shaft 32 in a manner described herein and in the previous application Ser. No. 141,398, so that the structure may assume the configuration shown in FIGS. 4 through 6. The resulting plug 15 thus defines one or more apertures 85 so that as plug 15 rotates between first and second rotational positions, second apertures 85 may move into and out of registry with first apertures 35, for respective flow communication through the closure of this invention for sealing thereof.

As stated above, plug 15 may define an outwardly facing open recess 87 defined by tubular wall 89 positioned within the sleeve and defining the second lateral aperture means 85. Recess 87 may serve as the well discussed above to receive samples of liquid from the container interior when it is full, and to receive liquid to be poured into or added to the liquid by flowing through the closure when it is in its open configuration.

It is also preferred, as in the embodiments described in the cited application Ser. No. 141,398, for the outermost thread portion 90 of plug 15, extending at least 360° about said plug, to be of a different pitch from the remaining plug. Thus the outermost thread portion 90 can serve as a seal and retaining lock of the plug in the threaded port, particularly in the closed position.

The above has been offered for illustrative purposes only, and is not intended to limit the invention of this application, which is as defined in the claims below.

That which we claim is:

1. An improved container comprising, in combination, a top lid having a port defined by an internally threaded cylindrical sleeve projecting downwardly into said container from said lid, a first radial passage formed in said sleeve, an externally threaded cylindrical plug positioned in said sleeve in threaded engagement therewith for sealing said port when said plug is rotated to a sealing position, the upper end of said plug including a cylindrical outer wall within which is provided a well-like recess open at its upper end, and a second radial passage formed through said plug outer wall in communication with said well-like recess, said second passage being located so it is aligned with said first passage when said plug is rotated to a first open position thereby permitting liquid within said container to flow into said well-like recess if said container is full, and said plug being rotatable to a second closed position where said first and second passages are out of alignment thereby closing said first and second passages.

2. An improved container as defined in claim 1 where said well-like recess is formed in two sections separated by a vertical tongue which facilitates gripping of said plug for rotating the same.

3. An improved container as defined in claim 1 where a plurality of first radial passages are formed in said sleeve, and a plurality of second radial passages are formed in said plug outer wall, said first and second passages being located so that when said plug is rotated to said first open position, each of said second radial passages will be aligned with a corresponding one of said first radial passages.

* * * * *